Patented Dec. 21, 1943

2,337,340

UNITED STATES PATENT OFFICE 2,337,340

CELLULOSE ESTER COMPOSITION

Lester W. A. Meyer and Frederick R. Conklin, Kingsport, Tenn., assignors to Eastman Kodak Company, Rochester, N. Y., a corporation of New Jersey No Drawing. Application June 10, 1941, Serial No. 397,424

8 Claims. (Cl. 106—181)

This invention relates to a composition of 100 parts of a stable butyric acid ester of cellulose containing 30-55% butyryl and 1-2 free hydroxyl groups per 24 cellulose carbon atoms and 5-30 parts of a plasticizer, at least 45% of which is di-2-ethyl hexyl adipate.

Di-2-ethyl hexyl adipate is compatible only to a very small extent with commercial cellulose acetate and, therefore, has no utility for plasticizing that ester. In contrast to its action with cellulose acetate, di-2-ethyl hexyl adipate is compatible in various proportions with stable butyric acid esters of cellulose, having a butyryl content of at least 30% and 1-2 free hydroxyls per 24 cellulose carbon atoms, and gives compositions with those cellulose esters of a plastic nature which are characterized by toughness, good resistance to the effects of water and weather and are readily worked up into commercial products.

An object of our invention is to provide plastic compositions of value in the making of plastic products, particularly those of a molded nature. Other objects of our invention will appear herein.

We have found that the combination of 100 parts of a stable cellulose acetate butyrate, having a butyryl content of 30-55%, 1-2 free hydroxyls per 24 cellulose carbon atoms and a viscosity of 5-75 seconds (1:4 acetone) with 5-30 parts of plasticizer, at least 45% of which is di-2-ethyl hexyl adipate, forms a thermoplastic composition from which molded products can be made having high permanence by reason of high resistance to moisture and leaching and which are easily molded due to good flow and sealing characteristics. By reason of high resistance to moisture and leaching, there is little, if any, tendency to warping, shrinking, discoloration, loss of strength or the like in the products prepared from compositions in accordance with our invention. Also, the compositions, in accordance with our invention, have good flow, good wet strength, good resistance to hot water, uniformity in strength with variation of temperature and sharp melting characteristics.

The cellulose esters, which we have found to be most suitable for use in compositions in accordance with our invention are stable as evidenced by a char point of at least 260° C. and preferably approximately 300° C. The esters, which we have found to be most suitable in our compositions, are cellulose acetate butyrates having a butyryl content of 30-55%, which have been slightly hydrolyzed, such as from ¼ to ½ of the way down to the diester or, in other words, having about 1-2 hydroxyls per 24 cellulose carbon atoms. Cellulose acetate butyrates are the esters with which we have principally worked and as these esters, containing substantially no other acyl groups than acetyl and butyryl, have proven to be quite satisfactory, it is to these esters that our invention is particularly directed. The invention, however, includes within its scope organic acid esters of cellulose containing 30-55% of butyryl and the hydroxyl content designated. The remainder of the acyl present may be any saturated fatty acid radical of at least two carbon atoms.

The cellulose esters, which we have employed, have been made by reacting upon cellulose with a reaction mixture in which butyric anhydride is employed, because to obtain high butyryl esters, it is ordinarily necessary to use mainly butyric anhydride as the anhydride in the reaction mixture. These esters may be prepared as described in U. S. Patent No. 2,250,201 of Malm and Kirton, dated July 22, 1941, or Malm application Serial No. 378,249, filed February 10, 1941. Our invention is restricted to the use of esters which have been stabilized in accordance with the Malm and Kirton process, as described in their patent referred to above, or which have a stability which is equivalent to that of esters prepared according to that process (that is with a char point of at least 260° C. and preferably 300° C or more). Another method of stabilizing the cellulose esters, which may be used, is the two-phase stabilization method described and claimed by Malm and Crane in their application Serial No. 382,584, filed March 10, 1941. An ester, which has been found to be particularly satisfactory in our invention is one having a butyryl content of 35-38%, substantially the remainder of the acyl being acetyl, which has been hydrolyzed approximately one-third of the way down to the diester (1½ free hydroxyls per 24 carbon atoms in the cellulose unit) and which has a char point of at least 280° C.

Di-2-ethyl hexyl adipate must be mixed with the cellulose ester in a proportion between 5 and 30 parts based on 100 parts of the cellulose ester. The amount of plasticizer ordinarily determines the flow characteristics of the composition. As molding compositions range all the way from extremely hard to extremely soft, the proportion of plasticizer used is governed by the use to which the composition is to be put. Ordinarily, in molding processes of the injection type, a molding composition, having what may be termed medium soft characteristics, is most suitable for ease of operation. For a composition of this type, a proportion of plasticizer, in accordance with our invention, between 15 and 20 parts per 100 parts of cellulose ester is used. In compression molding, compositions of medium soft or soft flow are ordinarily the easiest to use. For these compositions a proportion of approximately 20 parts of plasticizer to 100 parts of cellulose ester is employed. If molding compositions having harder characteristics are desired, smaller proportions of the plasticizer should be employed in the composition. For instance, proportions of plasticizer, ranging from 15 down to 10 parts per 100 parts of cellulose ester, range from medium to hard, while the range for molded compositions, having hard characteristics, is from 10 down to 5 parts of the plasticizer per 100 parts of cellulose ester, the compositions having near to 5 parts of plasticizer being extremely hard and having higher flow temperatures than the plastic compositions having flow characteristics designed as medium or soft. If the desired degree of softness is not imparted to the plastic composition by the use of 20 parts of the plasticizer therein for 100 parts of the cellulose ester, the amount of plasticizer may be increased up to as much as 30 parts of plasticizer. Plastic compositions become increasingly soft and have lower flow temperatures as the amount of plasticizer is increased and vice versa.

In view of the valuable plasticizing effect of di-2-ethyl hexyl adipate, other plasticizers may be mixed therewith in amounts up to 55% without detracting from the composition. For instance, a mixture of equal parts of di-2-ethyl hexyl adipate and dibutyl phthalate have been employed for plasticizing butyryl cellulose esters of the type described herein and the resulting product has had high moisture resistance and good plasticity. The addition of a plasticizer, which is not a fatty acid ester with di-2-ethyl hexyl adipate usually improves the characteristics of the plastic composition. Examples of plasticizers, which appear to supplement the action of di-2-ethyl hexyl adipate and improve its characteristics, are diethyl phthalate, dibutyl phthalate, diamyl phthalate, tributyrin and tricresyl phosphate. These auxiliary plasticizers are particularly valuable for use in plastic compositions of the soft-flow type, as by their use, supplemental to di-2-ethyl hexyl adipate, the resulting melted products obtained seem to be harder and of even greater permanence than when di-2-ethyl hexyl adipate is employed alone. These auxiliary plasticizers may be employed with di-2-ethyl hexyl adipate in any proportion up to 55% of the plasticizer mixture.

The plastic compositions of our invention are characterized by toughness as compared to the cellulose ester plastic compositions usually disclosed in the prior art. The toughness of plastic compositions is evidenced by good impact strengths and high elongation values. Impact strengths are ordinarily measured in a testing machine for that purpose, the modification of the machine employed for the test depending upon whether the Charpy or Izod test is to be conducted. Plastic compositions in accordance with our invention, using parts of plasticizer ranging from 5–30 per 100 parts of cellulose acetate butyrate, have shown high impact strengths tested by both the Charpy and Izod methods. This is true both of the compositions in which di-2-ethyl hexyl adipate is the sole plasticizer and those in which di-2-ethyl hexyl adipate is mixed with other plasticizers in various proportions within the limits of our invention.

The elongation of the plastic is measured by the distance that a strip of the plastic is stretched before it is ruptured. This value is obtained in the test of the plastic for tensile strength. Whereas compositions of high butyryl cellulose acetate butyrate plasticized with various values within the range of 5–30 parts of plasticizer per 100 parts of cellulose ester, using common plasticizers such as dibutyl phthalate or triphenyl phosphate, give elongation values on the order of 10–25%, the compositions in accordance with our invention have been found to give elongation values within the range of 26–172%, with the average of a large number of these values taken from various proportions of plasticizer and under both wet and dry conditions being approximately 71%.

It is desirable that the plastic compositions, in accordance with our invention, be substantially free of moisture, such as not more than .5% at the time of molding, for best results. The plastic compositions of our invention may take the physical form most suited for the use to which they are put. For instance, they may be in the form of sheets, slabs, granules or powder. If desired, materials may be added to our plastic compositions to give various effects. Some of the materials which may be added are suitable coloring materials, such as dyes, pigments, parts of colored material, metallic particles or the like. Thermoplastic compositions, in accordance with our invention, can be suitably prepared by the hot roll process described in Conklin Patent No. 2,048,686 of July 28, 1936, or by that described in the Conklin Patent No. 2,155,303 of April 18, 1939.

A composition in accordance with our invention was prepared by mixing together slightly hydrolyzed cellulose acetate butyrate having a butyryl content of 37.5%, an acetyl content of 13% and a char point of 295° C. and approximately 20 parts of a plasticizer consisting of 50% of di-2-ethyl hexyl adipate and 50% of dibutyl phthalate. The mass was then subjected to kneading on rolls having a temperature within the range of 275–325° C. which aids in thoroughly incorporating the plasticizer to convert the whole to a completely homogeneous mass. The plasticized sheet, thus prepared, may be thoroughly worked up, such as by pressing upon a hot platen press or mold, or it may be cut up into strips for molding into desired shapes, or it may be cooled and broken or granulated into small particles which may be molded in much the same manner as molding powders. The tensile strength of the molded material was determined as approximately 4100 lbs. and the wet tensile strength was approximately 3100 lbs. The flexural strength of the product was determined as approximately 4600 lbs. and the wet flexural strength was approximately 3400 lbs. The Rockwell hardness of the product was 58.8. With increase of plasticizer, such as the use of 30 parts, the Rockwell hardness of the product tested 35.8 and both the tensile strengths and flexural strengths were lower, but the flow of the plastic composition is accomplished at a lower temperature. With decrease of plasticizer, the hardness, tensile and flexural strengths of the product is increased but the flow of the plastic composition is accomplished at a higher temperature.

The above example was duplicated except that the plasticizer employed consisted entirely of di- 2-ethyl hexyl adipate. The Rockwell hardness of the product, containing 20 parts of plasticizer, was 53.2, the tensile strength was approximately 4100 lbs. dry and approximately 3400 lbs. wet. The flexural strength was approximately 4300 lbs. dry and 3400 lbs wet. Here again, with decrease of plasticizer, the hardness is increased, while with increase of plasticizer, the hardness, tensile and flexural strengths are decreased. Using 10 parts of this plasticizer, a product was obtained having a Rockwell hardness of 71.2 and tensile and flexural strengths greater than with the use of 20 parts of plasticizer. Using 30 parts of plasticizer, the Rockwell hardness was 21.6 and the tensile and flexural strengths were also smaller.

Instead of using equal parts of di-2-ethyl hexyl adipate and auxiliary plasticizer or three parts of adipate to one of auxiliary plasticizer, other proportions may be employed, providing the adipate constitutes at least 45% of the plasticizer mixture. For instance, other plasticizer mixtures, which may be employed, are the following:

| | | | | |
|---|---|---|---|---|
| Di-2-ethyl hexyl adipate | 45% | 65% | 85% | 55% |
| Dibutyl phthalate | 55% | 35% | 15% | 45% |

These plasticizer mixtures are merely illustrative to show that any plasticizer mixture, containing at least 45% of di-2-ethyl hexyl adipate, the remainder being essentially a plasticizer, preferably not a fatty acid ester, may be employed. For instance, in the above examples, diamyl phthalate, triphenyl phosphate or any of the other auxiliary plasticizers mentioned herein may be employed instead of the dibutyl phthalate or in admixture therewith.

A molding composition was prepared in a manner similar to the examples given above using a stable, slightly hydrolyzed butyric acid ester of cellulose having a butyryl content of approximately 50% and a char point of approximately 300° C. and approximately 5 parts of a mixture of di-2-ethyl hexyl adipate and dibutyl phthalate in equal parts. A homogeneous mass, eminently suitable for the manufacture of molded products, was obtained.

A stable cellulose acetate butyrate, having a butyryl content of 32% and containing 1½ free hydroxyls per 24 carbon atoms in the cellulose unit, was mixed with approximately 20 parts of a mixture of equal parts of di-2-ethyl hexyl adipate and triphetnyl phosphate to form a completely homogeneous mass by working up with hot rolls. The resulting composition was eminently suitable for the manufacture of molded products.

A stable, slightly hydrolyzed cellulose acetate butyrate, having a butyryl content of 37.5%, an acetyl content of 13% and a char point of 295° C., mixed with approximately 28 parts of a mixture of 80% of di-2-ethyl hexyl adipate and 20% tributyrin, was kneaded on hot rolls. A homogeneous mass, suitable for the manufacture of molded products, was obtained.

The thermoplastic compositions, in accordance with our invention, have good permanence and, therefore, should be substantially free from substances which will have unstabilizing tendencies, such as resins. The presence of volatile solvents is not necessary or even desirable to assure a satisfactory composition for the manufacture of molded products of good quality.

Compositions may be employed for making various molded articles, such as those for which cellulose ester plastics have heretofore been used. In addition, our plastic compositions are particularly adapted to the making of objects which are exposed to water or weather, such as toothbrush handles, artificial fish baits, exterior fittings for automobiles and the like. When made from our thermoplastic compositions, these objects exhibit good permanence due to their resistance to water, weather and moderate heat.

The tensile strength of the various products referred to above was determined by testing specimens having dimensions of 5" x ½" x 0.2" with the middle section ground down to ⅜". The dry tensile strength is given as the force required to break the dry specimen by extension, the unit being pounds per square inch. To determine the wet strength, the specimen was immersed in water at room temperature until saturated. Tests were made with an Olsen hydraulic testing machine. The wet tensile strength is the force required to break the specimen by extension while wet.

The flexural strength may be defined as the resistance of a specimen to breakage when a force is applied tending to bend a body. The flexural strengths of specimens 5" x ½" x 0.2" were determined on an Olsen tester, the wet strengths being determined after the specimens had been saturated with water.

The plastic compositions, in accordance with our invention, showed very little loss of plasticizer by leaching. This was determined by taking a pressed sample of the composition having dimensions 3" x 1" x .125", conditioning it for 24 hours at 150° F. and weighing immediately followed by immersion in a quart of distilled water at approximately 23° C. for 24 hours followed by weighing. The amount of water absorbed by the sample may be calculated from these weights. In every case the gain in weight was very small. To determine the percent of soluble material lost, the sample, after immersion, was again dried at 150° F. for 24 hours and immediately weighed. The percent loss in weight shows the loss of plasticizer from the sample by leaching. In every case but small loss of weight was experienced.

As pointed out above, molded products, in accordance with our invention, are also suitable for use under severe conditions, such as when the products are exposed to water and weather. This includes not only moderate heat and humidity but also the effect of ultraviolet and infra-red rays. Due to the high permanence of these products, there is no deterioration in their extended use.

If desired, compositions, such as described herein, may be dissolved in volatile solvents and coated out in the form of sheets of good plasticity. It is to be understood that the compositions described herein are useful in various types of thermoplastic processes including those in which the molten compositions are extruded to form elongated products having the form of reeds, sticks, filaments, strips or the like.

It is to be understood that the results obtained by the physical tests, as listed herein, are illustrative and indicative rather than being absolute and may vary to some extent from one instance to the next.

We claim:
1. A composition of matter comprising 100 parts of a stable slightly hydrolyzed fatty acid ester of cellulose containing at least 30% of butyryl and about 1-2 free hydroxyl groups per 24 cellulose carbon atoms and 5—30 parts of a plasticizer at least 45% of which consists of di-2-ethyl hexyl adipate.

2. A composition of matter comprising 100 parts of a stable slightly hydrolyzed cellulose acetate butyrate having a butyryl content of 35–38% and about 1–2 free hydroxyl groups per 24 cellulose carbon atoms and 5–30 parts of a plasticizer at least 45% of which consists of di-2-ethyl hexyl adipate.

3. A composition of matter comprising 100 parts of a stable slightly hydrolyzed butyric acid ester of cellulose containing approximately 50% butyryl and about 1–2 free hydroxyl groups per 24 cellulose carbon atoms and 5–30 parts of a plasticizer at least 45% of which consists of di-2-ethyl hexyl adipate.

4. A composition of matter having moderately soft flow comprising 100 parts of a stable slightly hydrolyzed fatty acid ester of cellulose containing at least 30% of butyryl and about 1–2 free hydroxyl groups per 24 cellulose carbon atoms and 15–20 parts of a plasticizer at least 45% of which consists of di-2-ethyl hexyl adipate.

5. A composition of matter comprising 100 parts of a stable slightly hydrolyzed fatty acid ester of cellulose containing at least 30% of butyryl and about 1–2 free hydroxyl groups per 24 cellulose carbon atoms and 5–30 parts of a plasticizer essentially consisting of 50–90% of di-2-ethyl hexyl adipate and 50–10% of an alkyl phthalate, the alkyl groups having 1 to 5 carbon atoms.

6. A composition of matter comprising 100 parts of a stable slightly-hydrolyzed cellulose acetate butyrate having a butyryl content of approximately 37.5% and an acetyl content of approximately 13% and 5–30 parts of a plasticizer at least 45% of which consists of di-2-ethyl hexyl adipate.

7. A composition of matter comprising 100 parts of a stable slightly-hydrolyzed fatty acid ester of cellulose having a butyryl content of 35–38% and about 1–2 free hydroxyl groups per 24 cellulose carbon atoms and 5–30 parts of a plasticizer essentially consisting of 50–90% of di-2-ethyl hexyl adipate and 50–10% of an alkyl phthalate, the alkyl groups having one to five carbon atoms.

8. A composition of matter comprising 100 parts of a stable slightly hydrolyzed fatty acid ester of cellulose having a butyryl content of 35–38% and about 1–2 free hydroxyl groups per 24 cellulose carbon atoms and 5–30 parts of a plasticizer essentially consisting of 50–90% of di-2-ethyl hexyl adipate and 50–10% of dibutyl phthalate.

LESTER W. A. MEYER.
FREDERICK R. CONKLIN.